(12) United States Patent
Steadman Booker et al.

(10) Patent No.: US 8,350,221 B2
(45) Date of Patent: Jan. 8, 2013

(54) APPARATUS AND METHOD FOR GENERATING COUNTABLE PULSES FROM IMPINGING X-RAY PHOTONS; AND CORRESPONDING IMAGING DEVICE

(75) Inventors: Roger Steadman Booker, Aachen (DE); Christian Baeumer, Hergenrath (BE); Christoph Herrmann, Aachen (DE); Guenter Zeitler, Aachen (DE); Hans Krüger, Bonn (DE); Walter Ruetten, Linnich (DE); Oliver Muelhens, Aachen (DE)

(73) Assignee: Koninklijke Philips Electronics N.V., Eindhoven (Nl)

( * ) Notice: Subject to any disclaimer, the term of this patent is extended or adjusted under 35 U.S.C. 154(b) by 324 days.

(21) Appl. No.: 12/670,876

(22) PCT Filed: Jul. 24, 2008

(86) PCT No.: PCT/IB2008/052967
§ 371 (c)(1),
(2), (4) Date: Mar. 11, 2010

(87) PCT Pub. No.: WO2009/019622
PCT Pub. Date: Feb. 12, 2009

(65) Prior Publication Data
US 2010/0172467 A1 Jul. 8, 2010

(30) Foreign Application Priority Data
Aug. 3, 2007 (EP) .................................... 07113793

(51) Int. Cl.
*G01N 23/00* (2006.01)
(52) U.S. Cl. ........... 250/363.04; 250/336.1; 250/370.09; 378/20

(58) Field of Classification Search ............. 250/370.09, 250/336.1, 363.04; 378/20
See application file for complete search history.

(56) References Cited

U.S. PATENT DOCUMENTS

| | | | | |
|---|---|---|---|---|
| 5,546,048 A * | 8/1996 | Sano et al. | ..................... | 330/263 |
| 5,811,809 A * | 9/1998 | Smith et al. | ................ | 250/336.1 |
| 6,509,565 B2 | 1/2003 | Nygard et al. | | |
| 6,781,426 B2 * | 8/2004 | Souchkov | ..................... | 327/154 |

(Continued)

FOREIGN PATENT DOCUMENTS
WO 2005065333 A2 7/2005

OTHER PUBLICATIONS

Soltveit: "Preamplifier-Shaper Prototype for the Fast Transition Detector of the Compressed Baryonic Matter (CBM) Experiment at Fair"; Proceedings of the 12th Workshop on Electronics for LHC and Future Experiments, Sep. 25-29, 2006, Valencia, Spain, 5 Page Document.

(Continued)

*Primary Examiner* — David Porta
*Assistant Examiner* — Djura Malevic

(57) ABSTRACT

The present invention relates to an apparatus (10) for generating countable pulses (30) from impinging X-ray (12, 14) in an imaging device (16), in particular in a computer tomograph, the apparatus (10) comprising a pre-amplifying element (18) adapted to convert a charge pulse (20) generated by an impinging photon (12, 14) into an electrical signal (22) and a shaping element (26) having a feedback loop (28) and adapted to convert the electrical signal (22) into an electrical pulse (30), wherein a delay circuit (38) is connected to the feedback loop (28) such that a time during which the feedback loop (28) collects charges of the electrical signal (22) is extended in order to improve an amplitude of the electrical pulse (30) at an output (56) of the shaping element (26). The invention also relates to a corresponding imaging device (16) and a corresponding method.

16 Claims, 13 Drawing Sheets

U.S. PATENT DOCUMENTS

| | | | |
|---|---|---|---|
| 6,858,847 | B1 | 2/2005 | Macciocchi |
| 6,977,380 | B2 | 12/2005 | Chowdhury et al. |
| 7,615,753 | B2 * | 11/2009 | Audebert et al. ........ 250/370.07 |
| 2002/0113211 | A1 | 8/2002 | Nygard et al. |

OTHER PUBLICATIONS

Pengg: "Pixel Detector Readout Electronics With Two-Level Discriminator Scheme"; IEEE Transactions on Nuclear Science, vol. 45, No. 3, Jun. 1998, pp. 745-750.

Canberra Industries Inc.: "Basic Counting Systems"; Product Information Document, 2006, 13 Page Document.

Blanquart et al: "Pixel Analog Cells Prototypes for Atlas in DMILL Technology"; Nuclear Instruments and Methods in Physics Research A 395, (1997), pp. 313-317.

Peric: "Design and Realisation of Integrated Circuits for the Readout OPF Pixel Sensors in High-Energy Physics and Biomedical Imaging"; Dissertation, Bonn University, 2004, 191 Page Document.

* cited by examiner

APPARATUS AND METHOD FOR GENERATING COUNTABLE PULSES FROM IMPINGING X-RAY PHOTONS; AND CORRESPONDING IMAGING DEVICE

FIELD OF THE INVENTION

The present invention relates to an apparatus, an imaging device and a method used in the counting X-ray photons, in particular photons in a computer tomograph.

BACKGROUND OF THE INVENTION

Computer tomography (CT, also called computed tomography) has evolved into a commonly used means, when it comes to generating a three-dimensional image of the internals of an object. The three-dimensional image is created based on a large number of two-dimensional X-ray images taken around a single axis of rotation. While CT is most commonly used for medical diagnosis of the human body, it has also been found applicable for non-destructive materials testing. Detailed information regarding the basics and the application of CT, can be found in the book "Computed Tomography" by Willi A. Kalender, ISBN 3-89578-216-5.

One of the key innovative aspects in future CT and X-ray imaging is the energy-resolved counting of the photons which are let through or transmitted by the object being analyzed when being exposed to X-ray radiation. Depending on the number and energy the transmitted photons have, it can be concluded, after a slice image reconstruction step, through which types of material the X-ray beams have traveled. In particular, this allows to identify different parts, tissues and materials within a human body.

When the detection or counting of photons is referenced, it is understood, that when a photon impinges on the conversion material of a sensor, it creates a charge pulse. This charge pulse (sometimes also referred to as current pulse) is detected and the presence of a photon is concluded. The charge pulse results from a larger number of electron-hole pairs, which are generated, when an X-ray photon interacts with the sensor conversion material. The duration of this current pulse corresponds to the so-called charge collection time.

Detection of single electron-hole pairs is not in the focus of this application, but the processing of a charge pulse resulting from electron-hole pairs representing a photon, which is sometimes expressed by the formulations "detecting photons" or "counting photons".

One of the main concerns when implementing a counting detector for computer tomography applications is to deal with the irregular nature of the arrival time sequence of the incoming photons. The flux of photons, which has to be considered, is very high and randomly distributed in time. The distribution of the photons can be described by a Poisson distribution, i.e. the arrival times are negative exponentially distributed.

Another concern comes in the context of the very high counting rates that are inseparably linked with computer tomography. Since count rates of photons in the range of $10^9$ cps/mm$^2$ (counts per second/mm$^2$) have to be dealt with for the direct beam or a beam which just touches the object's surface, very fast counting detectors have to be employed. Typically, however, detectors that can operate at high count rates, suffer from increased noise (due to the short shaping time available to shape an electric pulse) and from a reduced signal amplitude (due to the ballistic deficit).

SUMMARY OF THE INVENTION

It is an object of the present invention to provide an apparatus for generating countable pulses from impinging X-ray photons in an imaging device, in particular in a computer tomograph, having an improved counting performance, in particular at high rates. It is a further object of the present invention to provide a corresponding imaging device based on the counting X-ray photons, in particular for medical use. It is yet another object of the present invention to provide an improved method for counting X-ray photons, in particular photons in a computer tomograph.

According to one aspect of the invention this object is achieved by an apparatus for generating countable pulses from impinging X-ray photons in an imaging device, in particular photons in a computer tomograph, the apparatus comprising a pre-amplifying element adapted to convert the charge pulse generated by an impinging photon into an electrical signal and a shaping element having a feedback loop and adapted to convert the electrical signal into an electrical pulse, wherein a delay circuit is connected to the feedback loop such that a time during which the feedback loop collects charges of the electrical signal is extended in order to improve an amplitude of the electrical pulse at an output of the shaping element.

According to another aspect of the invention this object is achieved by an imaging device based on the counting of X-ray photons, in particular for medical use, comprising an apparatus as described before. Such an imaging device is in particular embodied as an X-ray machine, a computer tomograph, a device for nuclear medicine techniques (e.g. positron emission tomography or single photon emission computed tomography) or any other radiography device.

According to yet another aspect of the invention this object is achieved by a method for generating countable pulses from impinging X-ray photons in an imaging device, in particular in a computer tomograph, comprising the following steps:

pre-amplifying a charge pulse generated by an impinging photon into an electrical signal, shaping the electrical signal into an electrical pulse by employing a feedback loop, reaching a condition that is adapted to act as a trigger for discharging the feedback loop, and discharging the feedback loop, wherein the process for reaching the trigger condition is delayed in order to improve an amplitude of the electrical pulse.

Generally, a photon-counting channel consists of a pre-amplifying element (in particular a pre-amplifier) and a shaping element (in particular a shaper) followed by a discriminator. The main function of the pre-amplifier is to amplify the incoming signal and therefore must be designed to minimize the noise, in particular in accordance to the input capacitance. The main function of the shaper is to further improve the signal-to-noise-ratio (SNR) by limiting the bandwidth of a signal so that wide band noise, e.g. white noise, is suppressed. This however has the side effect of increasing the pulse duration and limiting the ability to process pulses at high rates.

Another important effect to take into account in the context of high counting rates is the ballistic deficit associated with the shaping element. Assuming it is desirable to preserve the full amplitude of the pre-amplifier pulse, the shaping time constant needs to be considerably larger than the pre-amplifier rise time or the input rise time. This however is typically not acceptable for high counting rates, so that the shaper signal typically has to start returning to the base line before the theoretical maximum is reached. This effect also needs to be taken into account to preserve the SNR.

The discriminator is basically a comparator that trips after the shaper output has reached a certain value (threshold). The threshold maps into a specific photon energy. By adding further discriminators with different thresholds, energy information of the incoming photons may be derived. Typically, a digital counter connected to the output of each discriminator counts the number of events that have surpassed the respective threshold.

The concept of the present invention can be best understood, when comparing it to a prior art counting detector that employs a pre-amplifier and a shaper. After the shaper has been discharged such that its feedback capacitor contains the same charge as before the pulse came in, which is also expressed as "returning the shaper to base line", the shaper awaits the next electrical signal from the pre-amplifier which has typically the shape of a rising flank. While this electrical signal is received, the shaper collects the charges received from the pre-amplifier producing, thus, an electrical pulse from these charges. The trailing edge of the output pulse is initiated by a defined condition ('trigger') which occurs after the forming of the electrical pulse is finished by discharging the shaper. It should be noted, that the term "discharging" can also encompass "resetting" the shaper, where the discharge is done via a path with close-to-zero resistance. Preferably, however, discharging is done via a non-zero resistance path, in particular a current source or a resistor, in order to avoid noise issues.

One approach commonly used is to derive the trigger from the rate at which the charges are delivered by the pre-amplifier or from the shape of the curve representing the total amount of charges collected in the feedback loop of the shaper. This approach, however, cuts off a non-negligible number of charges that should have been included in the electrical pulse. In other words, since these charges are missing from the electrical pulse just formed, the electrical pulse does not reach its full amplitude and therefore does not correctly represent the energy level of the photon to be counted. This means that the ballistic deficit is increased. The return to base line of the shaper cannot be triggered at a later point in time, due to the lack of another suitable trigger event.

It is at this point where the present invention comes in. It proposes that the basic concept for triggering the return to base line is maintained, however, with the point in time when the triggering event and the effect of the triggering event (the shaper returning to base line) actually occur is delayed. Putting it differently, the trigger event of a prior art apparatus is maintained, however, the integrating capacitor in the feedback loop is allowed to gather more charges (originating from the incoming charge pulse) for an extended amount of time so that the amplitude of the formed electrical pulse represents more accurately the energy level of the photon detected, thereby reducing the ballistic deficit.

It should be noted that the term "trigger" in the context of this application docs not relate primarily to a digital trigger signal or to extra circuitry that provides such a trigger. Instead, the terms "trigger" or "triggering" explicitly includes events that base on self-triggering or that describe a certain state that leads to a different behavior of the associated system. An example for such a "trigger" is a diode that reaches it breakthrough voltage which leads to the diode now conducting in a reverse direction (different behavior of the diode). Another example is a transistor which—when exceeding a certain base-emitter voltage—suddenly starts conducting (different behavior of the transistor).

It is further noted that the pre-amplifier and the shaper can be embodied as separate parts of a circuitry. However, for several applications it is preferred to combine the pre-amplifier and the shaper into one circuitry, known as a shaping pre-amplifier. It is further noted that the present invention can be used with a variety of triggering concepts that discharge the shaper, including concepts that reset the shaper. Yet, the invention is particularly useful in the context of a certain triggering mechanism that will be further described below, especially with reference to the accompanying figures.

In a preferred embodiment the delay circuit is connected to an input of the shaping element and to the output of the shaping element.

This allows for an easy integration into existing designs. For certain types of apparatus it may even be possible to provide a retrofit to existing systems. The term "connected" does not imply a direct connection. Instead, other electrical elements, in particular switching elements, can be located along the respective electrical path.

In a further preferred embodiment the delay circuit comprises a source-follower circuit adapted to react slowly to one of a positive or a negative signal.

The source-follower circuit can be easily integrated into existing designs on a semiconductor-basis. Furthermore, the source-follower circuit allows to adjust or calibrate certain parameters. For a design using a CZT—(cadmium zinc telluride—) sensor, it is preferred that the delay of the source-follower does not apply to positive signals. This ensures that no overshoot or over-compensation occurs. However, should another sensor be preferred, e.g. a silicon sensor that operates with a different polarity, the source-follower can be easily adapted to cause the delay for positive signals only, e.g. by replacing n-MOSFETs by p-MOSFETs and vice versa.

In a further preferred embodiment the delay circuit is connected to a switching element adapted to control a discharging of the feedback loop.

Such a switching element can be embodied on a semiconductor-basis, in particular as a transistor. When the transistor reaches saturation, the discharging of the feedback loop is triggered and the shaper returns to base line. Since there are different means in order to control the saturation process of a transistor, the discharging of the feedback loop can be well controlled.

In a further preferred embodiment a switching action of the switching element for discharging the feedback loop is delayed by the source-follower circuit.

While the combined functionality of the source-follower circuit and the switching element will be described in more detail in the corresponding figures, the basic idea is now described: As the pre-amplifier starts building up the electrical signal, typically a step-like signal, the shaper starts collecting the charges delivered from the pre-amplifier using the feedback loop. At a certain point in time the number of charges coming from the pre-amplifier bring about a change in the shaper and/or the associated circuitry (here, the state of a switching element changes) that makes the shaper return to base line. The source-follower circuit, however, reacts rather slowly to the process that leads to this change, so that the switching element will react only at a later point in time. During this additional time, the shaper can continue to collect charges, thereby forming an electrical pulse that represents more accurately the actual energy level of the photon detected. For further details, reference is made to the figures.

In a further preferred embodiment the switching element is integrated into a current mirror.

This allows to reliably combine the switching element with a current source that will be used to remove charges from the feedback loop, thereby achieving the discharging of the feedback loop and the return of the shaper to base line.

In a further preferred embodiment a pole-zero cancellation element is electrically connected between the pre-amplifying element and the shaping element.

The pole-zero cancellation element is used in order to prevent any undershooting at the input of the shaper. It improves the design when no delay is used and can be used to relax the requirements on the design of the shaper.

In a further preferred embodiment the shaping element is provided with a compensating circuit adapted to compensate for dependencies, in particular temperature dependencies, introduced by the delay element.

Adding the delay element, in particular the source-follower delay, affects the equilibrium of the shaping element. At the output of the shaping element there is at least the equivalent of one transistor threshold voltage (of the source-follower MOSFET). If there is no input signal, a feedback capacitor of the feedback loop is charged to this equivalent voltage. This has no effect on the performance as such, but it may compromise the stability of the circuit with regard to temperature. This is due to the fact that the threshold voltage may vary significantly with temperature. A preferred solution is to add an additional source-follower acting as an output stage. Both threshold voltages will compensate and therefore it will reduce the temperature dependency to a great extent.

In a further preferred embodiment the compensating circuit is adapted to compensate by modifying a reference voltage of the shaping element and/or of the pre-amplifier element.

By biasing the non-inverting input of the pre-amplifying element and/or the shaping element dependencies, in particular temperature dependencies, can be compensated. The compensating circuit uses the same (or very similar) elements as in the delay element, so that a dependency, which affects the delay element, will affect the compensating circuit, too. Thus, the overall effect of the mentioned dependency becomes negligible.

In a further preferred embodiment the pre-amplifying element has a capacitor and a resistor arranged in parallel, wherein the resistor has a value that ensures a discharge of the capacitor at high rates and a good noise performance.

The output of the pre-amplifying element typically has a step-function-like electrical signal. The value of the resistor is chosen to be very large in order to return the capacitor to base line when there is not activity at the input. This achieves a good noise performance. At the same time, the value of the resistor is chosen to be low enough to discharge the capacitor fast enough so that the pre-amplifying element does not reach saturation under high rate conditions.

In a further preferred embodiment two topological current mirrors connected in series are connected in parallel to an amplifying element of the shaping element.

This allows to achieve a symmetrical response when applying bipolar signals. It is noted out that this design also enables a differential implementation as will be also be described further down. It is further pointed out that this embodiment is viewed as an independent invention which can be practiced without the delay circuit.

The term "topological" indicates that while each of the topological current mirrors has the topology to act as a current mirror, it will not function as a current at all times. In fact, as will be explained in more detail below, for a typical implementation only one of the topological current mirrors will function as a current mirror at any given time, depending on the polarity of the incoming signal, while the other topological current mirror is inactive with respect to its topological ability to mirror a current.

In a further preferred embodiment a current sink is connected to the two topological current mirrors.

When applying the idea of the two topological current mirrors, the current sink may be connected to only one current mirror, in particular at an input side of the amplifying element of the shaper. However, the suggested embodiment removes the current sink from the input node, in particular it is arranged between the two current minors, which can bring improvements with respect to noise.

In a further preferred embodiment the apparatus has a differential design, so that the difference between a first signal and a second signal is processed.

This design can make the apparatus immune to common mode disturbances, thereby increasing the accuracy of the apparatus. Since a common mode disturbance effects both the first signal and the second signal in essentially the same manner, the difference of the two signals remains unaffected. It is pointed out that this embodiment is viewed as an independent invention which can be practiced without the delay circuit and without the two current mirrors.

In a further preferred embodiment a first section of the shaping element adapted to process the first signal has the same design as a second section of the shaping element adapted to process the second signal.

This allows to achieve nearly identical characteristics for the processing of the first signal and the processing of the second signal. The term "section" refers in particular to the discharging circuit and the feedback capacitor. Ha delay circuit is present, it is also considered part of the "section".

These and other aspects of the invention will be apparent from and elucidated with reference to the embodiments described herein after.

It is to be understood that the features mentioned above and those yet to be explained below can be used not only in the respective combinations indicated but also in other combinations or as isolated features, without leaving the scope of the present invention.

BRIEF DESCRIPTION OF THE DRAWINGS

Embodiments of the invention arc shown in the drawings and will be explained in more detail in the description below with reference to the same, in which.

DETAILED DESCRIPTION OF EXEMPLARY EMBODIMENTS

Figure 1:
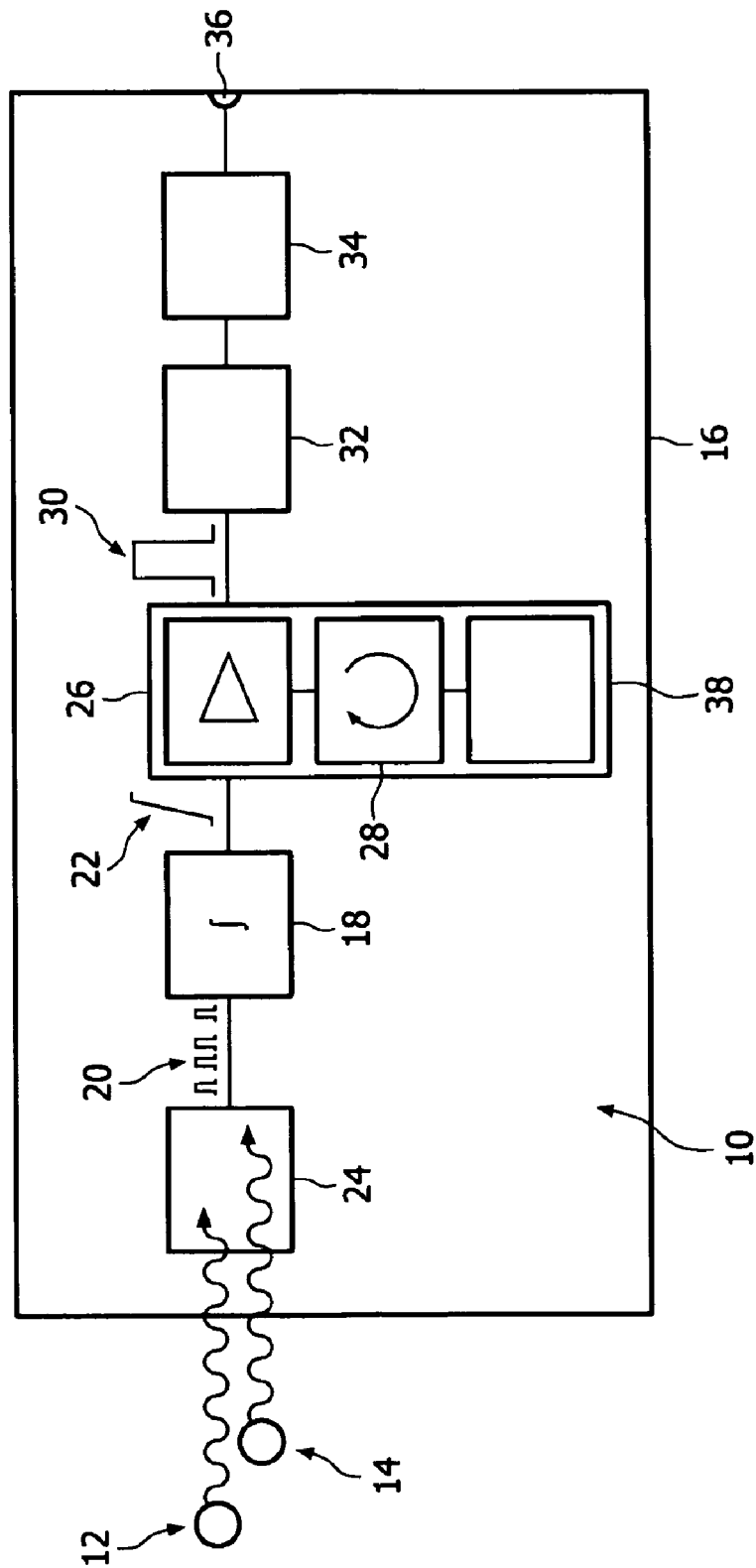
FIG. 1 shows an imaging device based on the counting of X-ray photons, comprising an apparatus according to the present invention.

FIG. 1 shows a symbolized high-level overview of an apparatus 10 for generating countable pulses from impinging X-ray photons 12, 14 in an imaging device 16, in particular a computer tomograph. For reasons of simplification only one the structure for one pixel is shown, even though the imaging device 16, of course, uses a plurality of pixels, in particular arranged in an array. However, since all pixels have the same basic functionality, it is sufficient to explain the invention with respect to one pixel.

The apparatus 10 comprises a pre-amplifying element 18, called "pre-amplifier" in the following, adapted to convert a charge pulse 20 (resulting from a larger number of electron-hole pairs) generated by each of the photons 12, 14 upon impinging on a sensor element 24 of the imaging device 16 into an electrical signal 22. The electrical signal 22 is conducted to a shaping element 26, which will be called "shaper" in the following, having a feedback loop 28. The shaper 26 is adapted to convert the electrical signal 22 into a countable electrical pulse 30.

Figure 2:
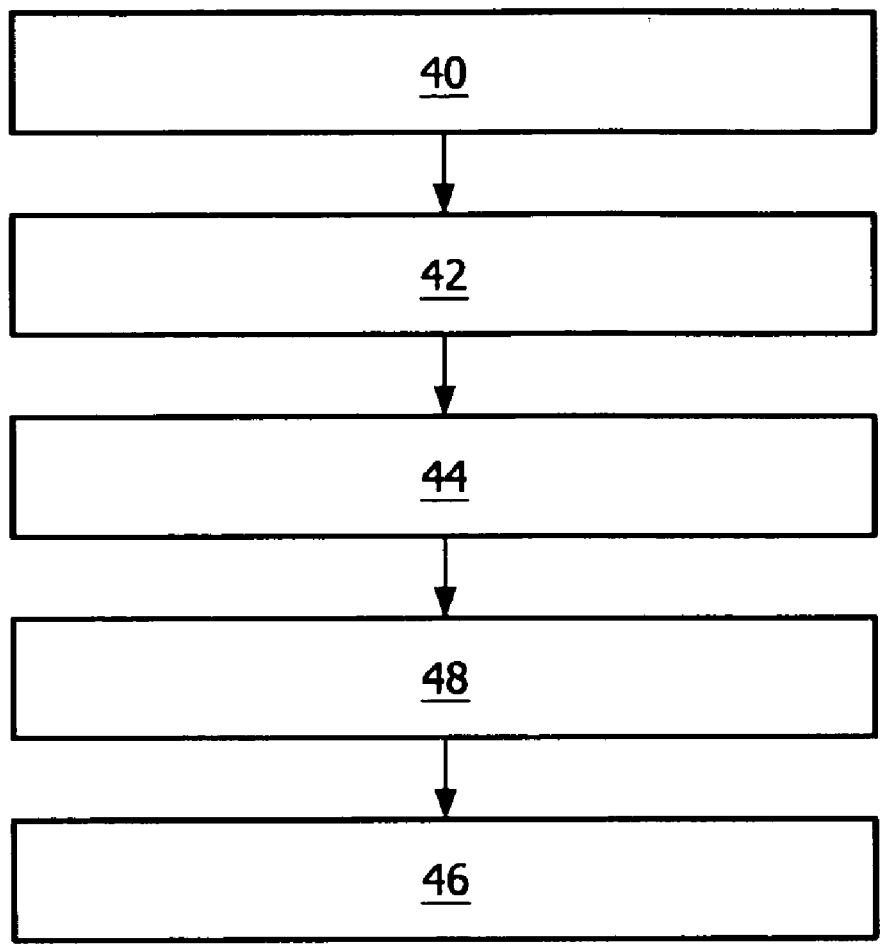
FIG. 2 shows a method for generating countable pulses from impinging X-ray photons in an imaging device.

The electrical pulse 30 is conducted to at least one discriminator 32 within the imaging device 16, where it is determined if the electrical pulse 30, that ideally corresponds to the photon 12, 14 that has impinged on the sensor element 24, exceeds a certain energy level or whether the energy lies within a certain range. If a certain condition is met or if the energy is found to be within a defined range a counting event is generated and sent to the counter 34. The count number provided by the counter 34 is provided at an output 36 for further processing. The apparatus 10 according to the present invention further comprises a delay circuit 38 which is connected to the feedback loop 28 as will be described in further detail below. The delay circuit 38 extends the time during which the feedback loop 28 collects charges of the electrical signal 22 in order to improve an amplitude of the electrical pulse 30 at an output of the shaper 26. FIG. 2 shows a method for generating countable pulses 30 from impinging X-ray photons 12, 14 in an imaging device 16, in particular in a computer tomograph. The method comprises the following steps:

pre-amplifying (step 40) a charge pulse 20 generated by an impinging photon 12, 14 into an electrical signal 22, shaping (step 42) the electrical signal 22 into an electrical pulse 30 by employing a feedback loop 28, reaching (step 44) a condition that is adapted to act as a trigger for discharging the feedback loop 28, and discharging (step 46) the feedback loop 28.

According to the method of the present invention a further step is introduced between step 44 and step 46, namely the step of delaying, step 48, the process for reaching the trigger condition and discharging the feedback loop 28. This means that the actual discharging of the feedback loop 28 is delayed compared to a situation when the time is not extended. Due to the extended time the feedback loop 28 continues to collect charges from the electrical signal 22, so that an amplitude of the electrical pulse 30 is improved.

Figure 3:
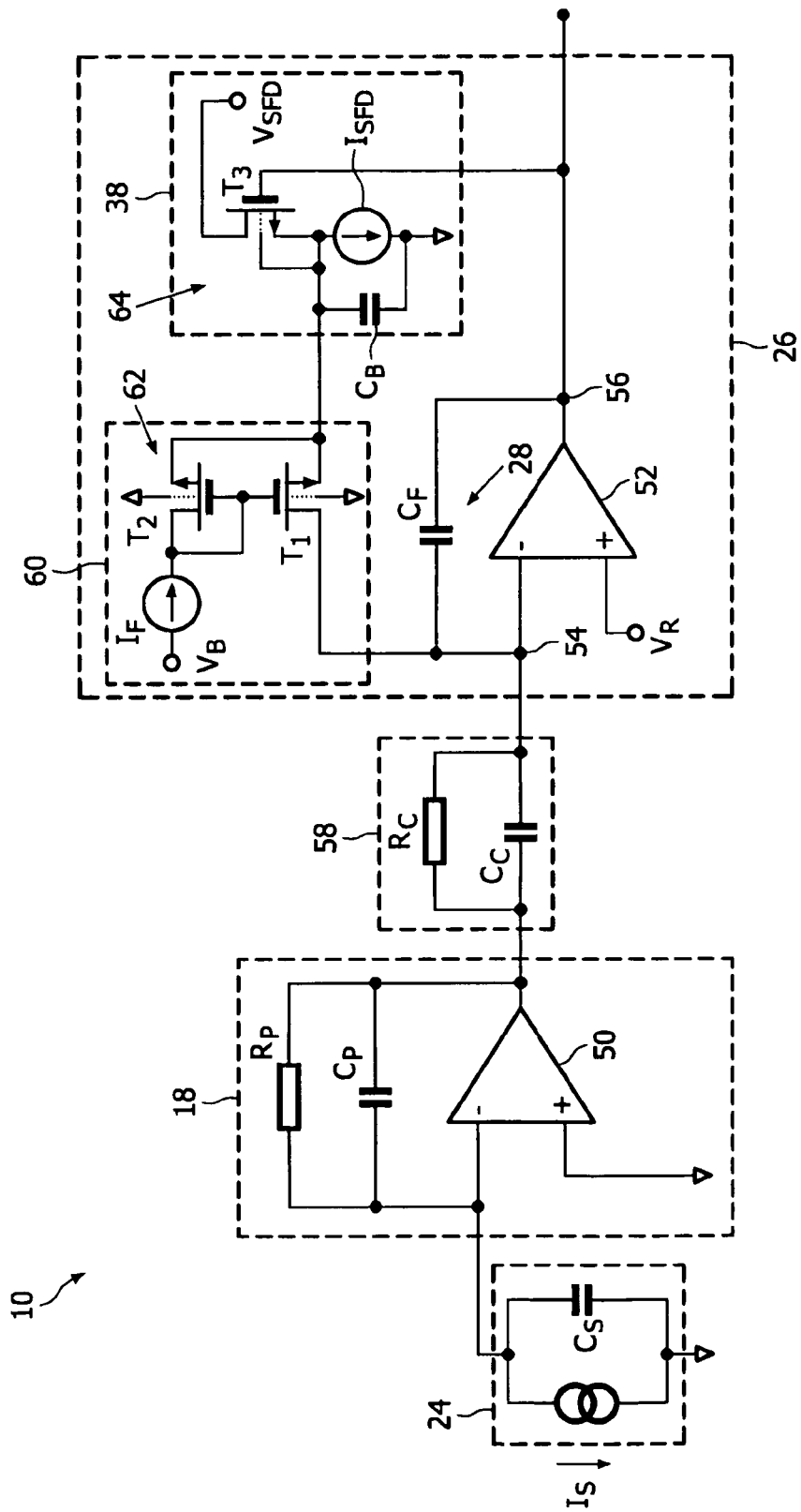
FIG. 3 shows a first embodiment of the apparatus according to the present invention.

FIG. 3 shows the apparatus 10 at a greater level of detail. The same reference numerals are maintained for elements that have a similar functionality as previously described.

The sensor element 24 is represented as a current source $I_S$ and a capacitor $C_S$ in parallel. The pre-amplifier 18 comprises a first operational amplifier 50 that has a capacitor $C_P$ as a feedback path. A resistor $R_P$ is connected in parallel to the capacitor $C_P$ in order to discharge the capacitor $C_P$ during operation. In this embodiment, the non-inverting input of the first operational amplifier 50 is connected to ground.

The shaper 26 has a second operational amplifier 52 with a capacitor $C_F$ as the feedback loop 28. The non-inverting input of the second operational amplifier 52 is connected to a voltage reference $V_R$. The shaper 26 has an input 54 and an output 56.

Between the pre-amplifier 18 and the shaper 26 a pole-zero cancellation element 58 is provided in order to prevent undershooting at the input 54 of the shaper 26.

The cancellation element 58 comprises a capacitor $C_C$ and a resistor $R_C$ in parallel.

Considering only the elements that have been described with regards to FIG. 3, the apparatus 10 would not function correctly. This is due to the fact that the capacitor $C_F$ will continue to collect charges until it has reached its maximum capacity, which means that the shaper 26 will not return to base line as required.

In order to discharge the feedback loop 28 and to return the shaper 26 to base line, a discharging circuit 60 is provided. The main part of the discharging circuit 60 is a transistor $T_1$ which—when active—allows current from a current source $I_F$ connected to a bias voltage $V_B$ to remove charges stored in the capacitor $C_F$, thereby resetting the feedback loop 28. The transistor $T_1$ is arranged with another transistor $T_2$ in a current mirror 62. The functionality of the discharging circuit 60 in connection with the shaper 26 is only briefly described, since such a constant-current feedback design is known from the documents by L. Blanquart, A. Mekkaoui, V. Bonzom, P. Delpierre, Pixel along cells prototypes for ATLAS in DMILL technology, Nucl. Instr. Meth. A 395 (1997), 313-317 and by Ivan Peric, Design and Realization of Integrated Circuits for the Readout of Pixel Sensors in High-Energy Physics and Biomedical Imaging, Dissertation, Bonn university, 2004.

In equilibrium the drain-source voltage of $T_1$ is zero. For positive signals at the input 54 of the shaper 26, these charges start to accumulate on the left plate of the capacitor $C_F$ ("left" being in reference to the orientation of the figure). The second operational amplifier 52 regulates the inverting input to equal the voltage reference $V_R$. The output voltage decreases until transistor $T_1$ is forced to enter saturation which, in turn, makes a current equal to $I_F$ flow through it (current mirror 62 with $T_2$). (It should be noted, that when the drain-source voltage exceeds the gate-source voltage less the threshold voltage, the transistor $T_1$ saturates almost immediately.) This compensates the charges accumulated in $C_F$. The shown shaper 26 is basically based on a non-linear feedback. The shaping time can be tuned by changing the feedback current by the current source $I_F$.

While this presents a workable solution, the known constant-current feedback design suffers from the disadvantage that for short shaping times the capacitor is being discharged before it has had a chance to reach the maximum corresponding to the electrical signal 22 (step function) delivered by the pre-amplifier 18. The present invention has realized this issue and offers a concept to compensate or minimize for this ballistic deficit by introducing a delay that allows the capacitor $C_F$ to accumulate most of the charges from the electrical signal 22 before the feedback current of the current source $I_F$ forces the shaper 26 to return to base line.

In order to achieve this, a delay circuit 38 is inserted in the feedback loop 28. In this case, the delay circuit 38 is inserted in series between the transistor $T_1$ and the output of the operational amplifier 52. The delay circuit 38 comprises a source-follower circuit 64 with a transistor $T_3$ that is connected to a voltage $V_{SFD}$. The source-follower circuit 64 has a bias current source $I_{SFD}$ that limits the response of the transistor $T_3$. The value of the current source $I_{SFD}$ will be chosen large enough so that it can source the feedback current. The transistor geometry of $T_3$ is such that, in combination with the current source $I_{SFD}$ parallel to a capacitor $C_B$, the source-follower circuit 64, and thus the delay circuit 38, reacts slowly to incoming negative signals. This has the effect, that the saturation of $T_1$ is delayed and that the output of the shaper 26 is allowed to decrease further before the shaping action takes place and the shaper 26 outputs the desired countable electrical pulse 30. The delay time, meaning the time by which the "standard" time (without a delay circuit) is extended, can be timed by the value of the current source $I_{SFD}$ and/or by the value of the capacitor $C_B$. It should be noted that the design of the feedback loop 28, the discharging circuit 60 and the delay circuit 38 can vary significantly. However, it is believed that the design according to FIG. 3 is preferable.

Figure 4A:
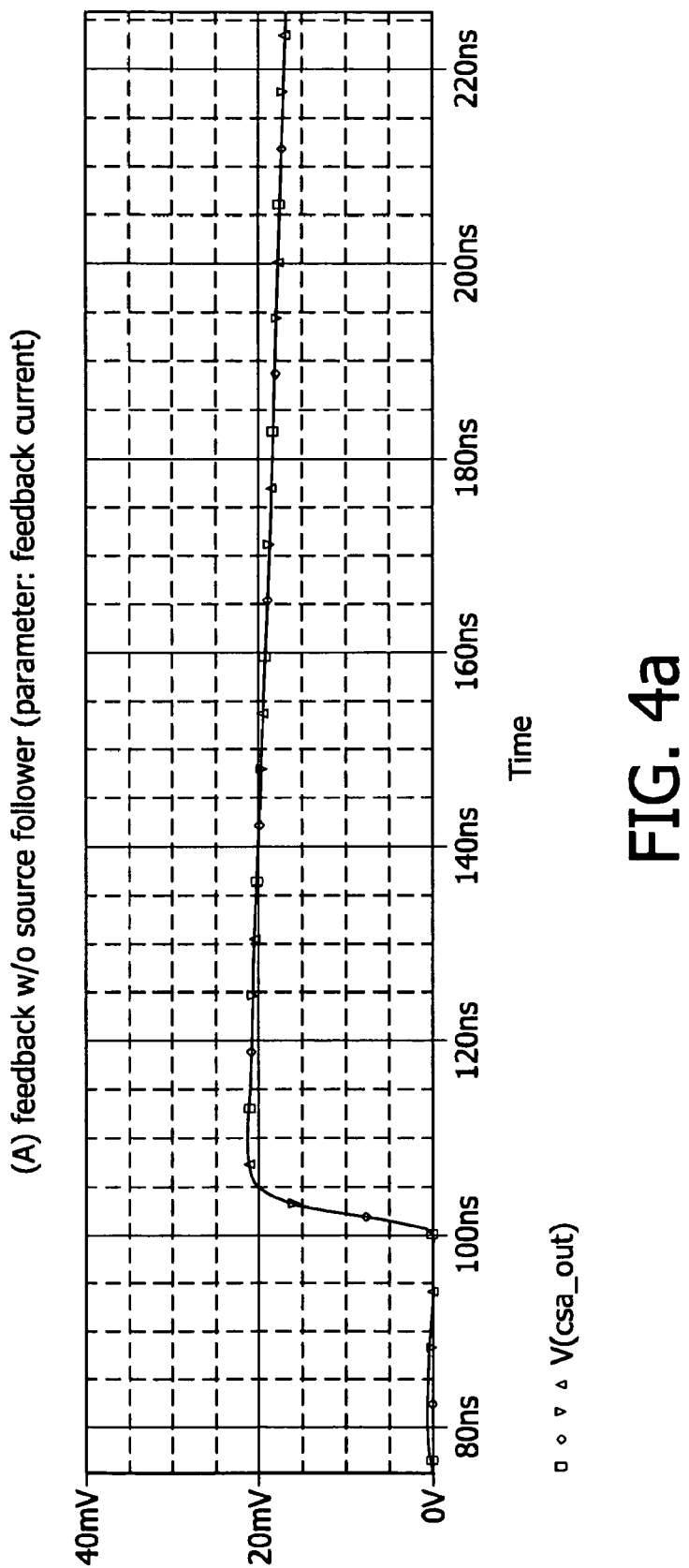
FIG. 4 shows a diagram of the response of the shaping element when the delay element is deactivated by bypassing it.
Figure 4B:
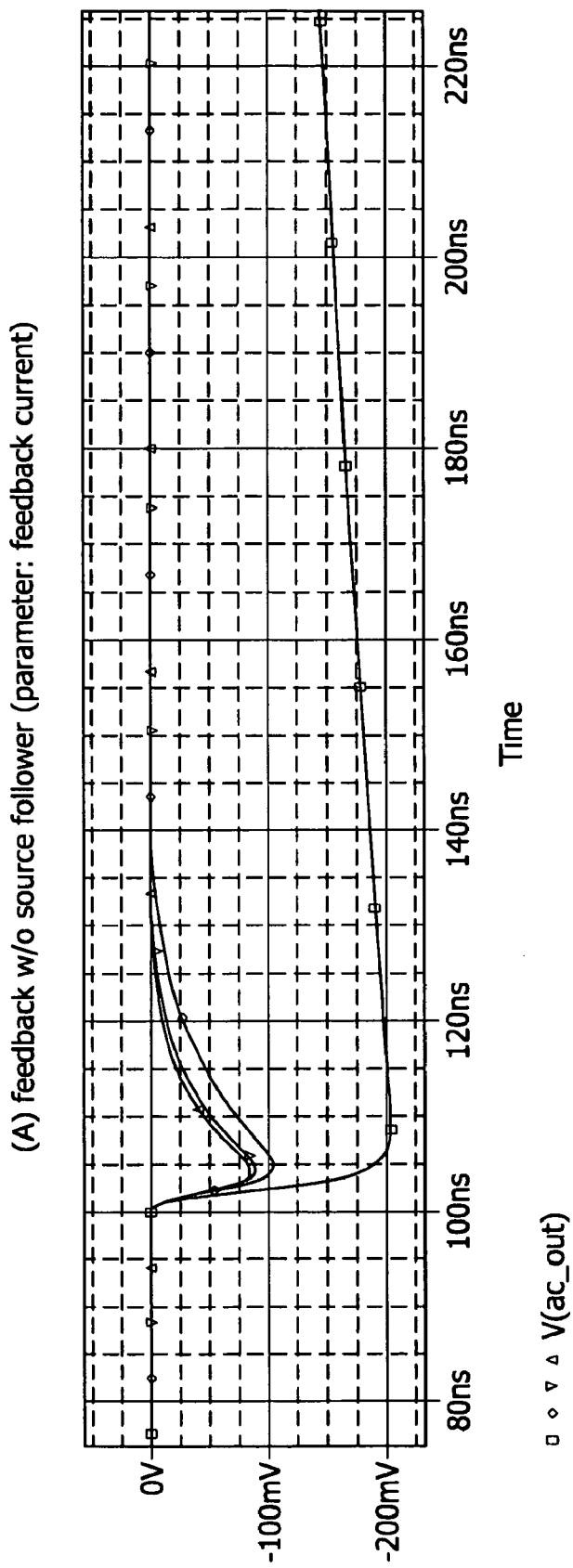
Figure 5A:
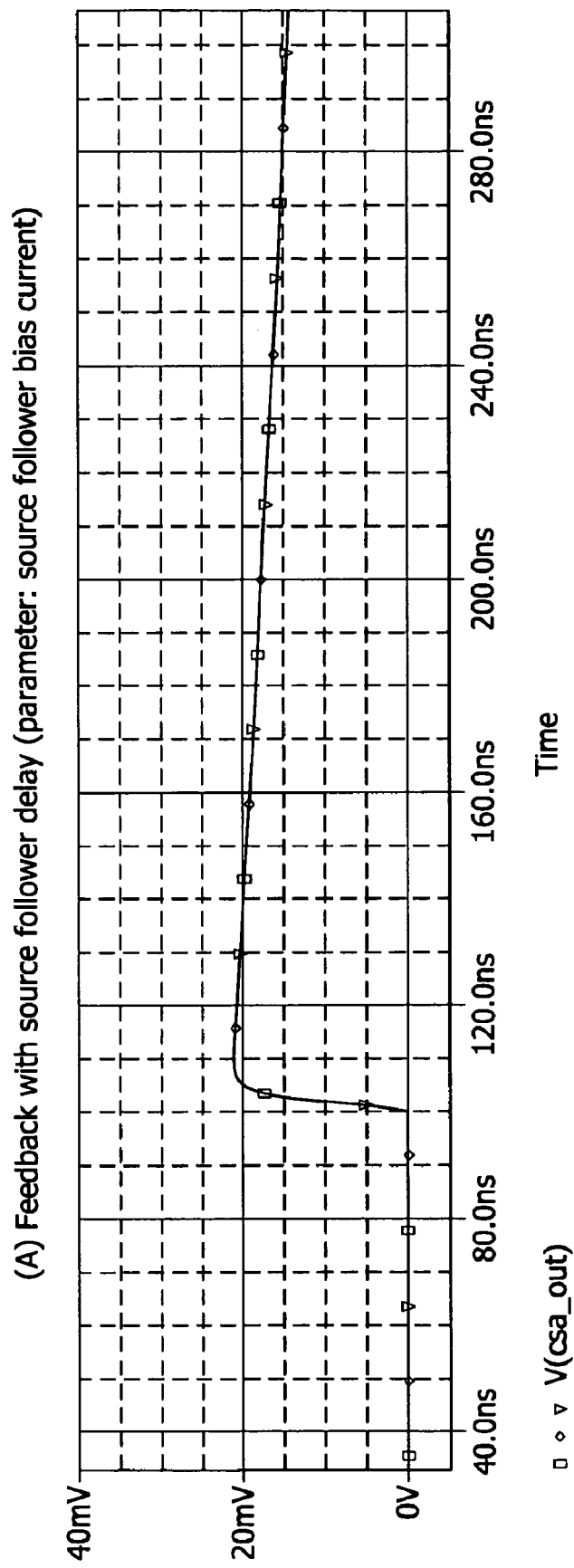
FIG. 5 shows a diagram of the response of the shaping element when the delay element is active.
Figure 5B:
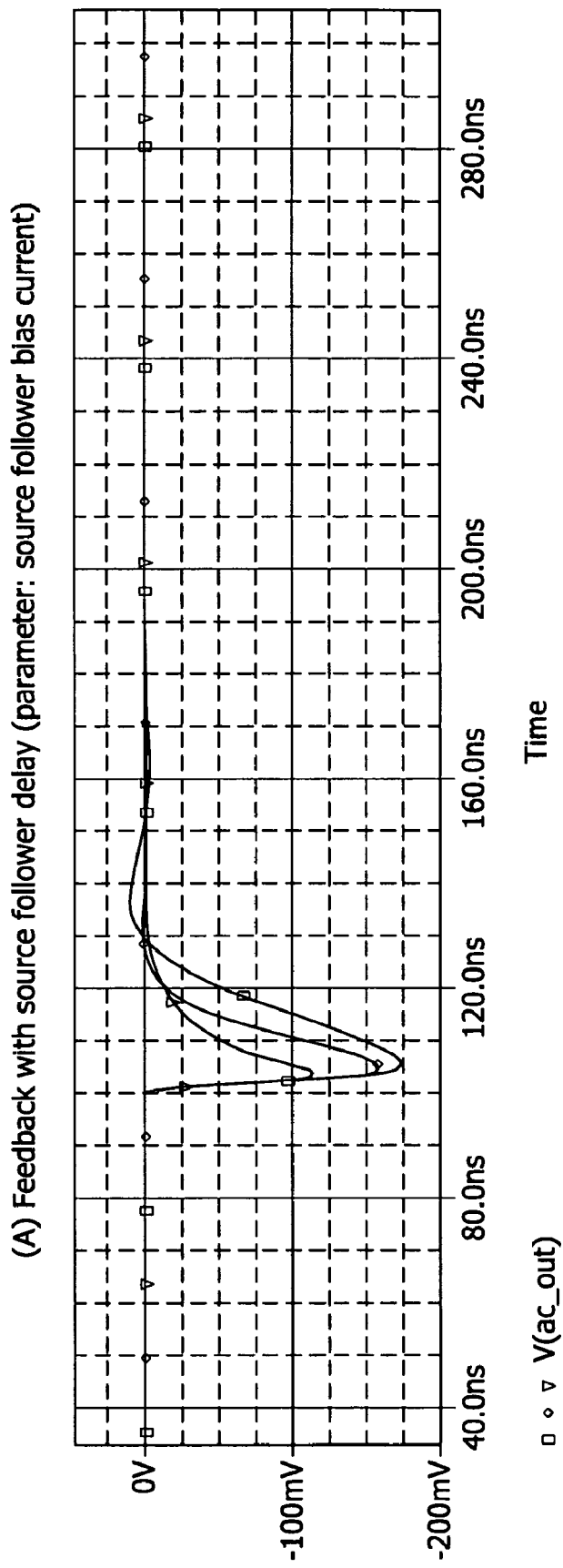

To better illustrate the significant effect of the delay circuit 38, FIGS. 4 and 5 are provided. Both figures show diagrams of the response of the shaper 26 when receiving and electrical signal 22 from the pre-amplifier 18. However, while FIG. 5 shows the response of the shaper 26 embodied in an apparatus W according to FIG. 3, FIG. 4 shows the response of the shaper 26 without the delay circuit 38, which means that the delay circuit 38 is replaced by a wire connection.

The diagrams show along their X-axis a time line in ns and along their Y-axis a voltage range in mV. In each figure, section a shows the output of the pre-amplifier 18 and section b shows the output of the shaper 26 with feedback.

The different traces in section b of the diagram of FIG. 4 correspond to different settings of the current source $I_F$, in particular 0 nA, 50 nA, 100 nA and 150 nA that lead to peak voltages of approximately −205 mV, −105 mV, −83 mV and −80 mV, respectively. The trace for $I_F$=0 nA corresponds to a situation where the shaper does not get discharged, thereby showing which energy level could be achieved if all charges could actually be collected. (The fact that the voltage decays even without a feedback current that discharges the capacitor $C_F$ lies in the non-ideal properties of any real-life circuit.)

The different traces in section b of the diagram of FIG. 5 correspond to a fixed setting of $I_F$ (according to FIG. 4) with varying settings for the bias current source $I_{SFD}$, in particular 0.5 μA, 1 μA and 5 μA, that lead to peak voltages of approximately −175 mV, −160 mV and −115 mV, respectively.

When comparing the traces of sections b of FIGS. 4 and 5 it can be clearly seen, that the output of the shaper 26, when employing the invention, reaches—depending on the chosen value of the current source $I_{SFD}$—almost twice the amplitude, therefore improving significantly the SNR. Preferably, $I_{SFD}$ is chosen so that no overshoot occurs. For the given situation this means, that the bias current source $I_{SFD}$ would be set to 1 μA. It should be noted that the delay circuit does not significantly affect the pulse width.

Figure 6:
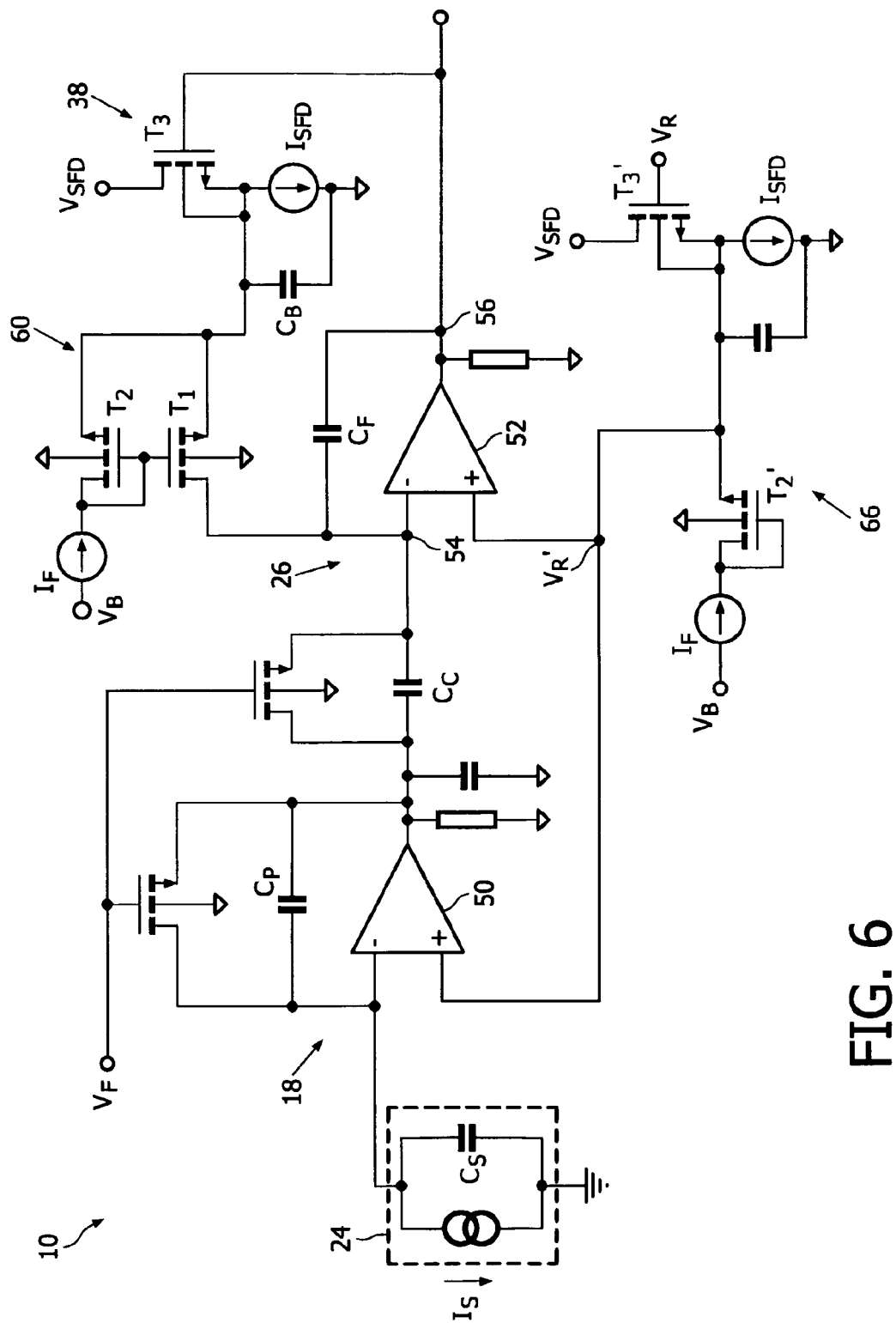
FIG. 6 shows a second embodiment of the apparatus according to the present invention.

FIG. 6 shows a second preferred embodiment of the apparatus 10. Since this apparatus 10 employs the same basic functionality as the apparatus 10 of FIG. 3, only the relevant differences over FIG. 3 will be explained.

One significant difference is the compensation circuit 66 that compensates for drifts by modifying a reference voltage $V_R'$ of the shaper 26. In order to achieve this, the transistors $T_2$ and $T_3$ of the discharging circuit 60 and of the delay circuit 38 are replicated as $T_2'$ and $T_3'$ (it is not necessary to replicate $T_1$) as well as the bias voltage $V_B$ and the current source $I_F$. The voltage $V_R$, that was previously (see FIG. 3) applied to the shaper 26 directly, is now applied to the gate of $T_3'$. The voltage $V_R$ is chosen so that the desired reference voltage $V_R'$ for the shaper 26 is achieved. Any drift on the feedback current is compensated, since a drift in this bias would move the operation points of $T_3$ as well as $T_3'$. Any deviation of the operation point of $T_2$ or $T_3$ will equally affect $T_2'$ and $T_3'$. In this way, the circuit is not susceptible to temperature drift within the tolerances of a realistic implementation.

Another difference over FIG. 3 is the fact, that the reference of the first operational amplifier 50 of the pre-amplifier 18 is now connected to the compensation circuit 66. In this way DC currents induced by non-equal references can be avoided. Since a DC current would also move the operation point of the feedback transistors, having the same reference helps minimizing this effect.

Yet another difference is present with respect to the resistors $R_P$, $R_C$ of the pre-amplifier 18 and the pole-zero cancellation element 58, which are now implemented as transistors in the triode region, connected to a feedback voltage $V_F$. This approach facilitates the implementation.

Figure 7:
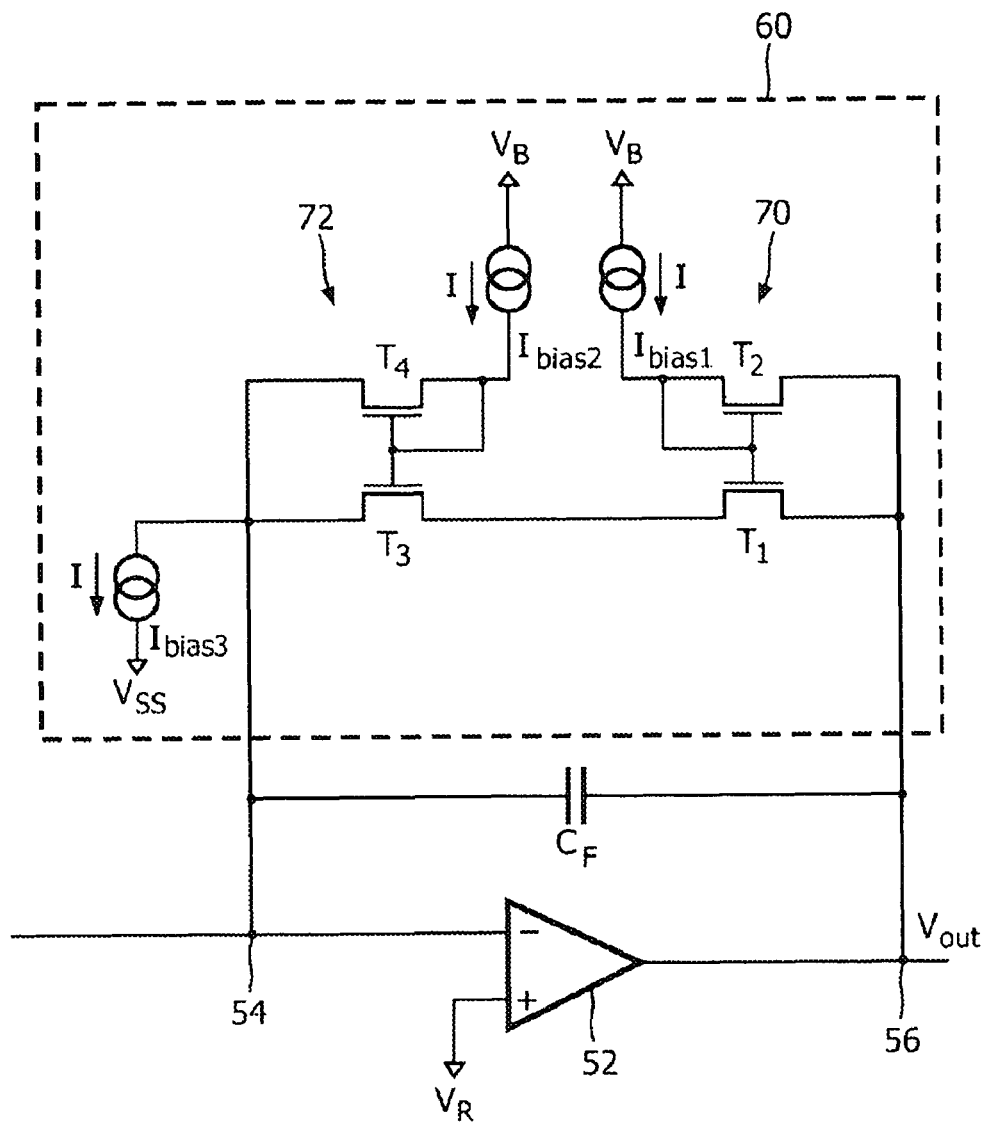
FIG. 7 shows a first preferred embodiment of the discharging circuit of the apparatus according to the present invention with a symmetrical design.

FIG. 7 shows a first preferred embodiment of the discharging circuit 60 of an apparatus 10 according to the present invention, wherein the discharging circuit 60 has a symmetrical design. The discharging circuit 60 is part of a shaping element 26 which does not employ a delay circuit 38. However, it should be noted, that a delay circuit 60 can be easily added, if desired, in a manner similar to the designs shown in FIGS. 3, 6 and 11.

The symmetrical design is achieved by two topological current mirrors: The first topological current mirror 70 comprises transistors $T_1$ and $T_2$, and the second topological current mirror 72 comprises transistors $T_3$ and $T_4$. The current mirrors 70, 72 can in particular be considered as two symmetric MPECs (Multi-Picture Element Counters).

The first current mirror 70 is connected to a current source $I_{bias1}$, and the second current mirror 72 is connected to a current source $I_{bias2}$. Each of the current mirrors 70, 72 is connected to a corresponding bias voltage $V_B$. A current sink $I_{bias3}$ is connected to node 54, to which the second current mirror 72 is connected. Current sink $I_{bias3}$ is connected to a sink voltage $V_{SS}$ and is provided to ensure that e.g. current source $I_{bias2}$ does not interfere with the discharge process of feedback capacitor $C_F$. More specifically, the same amount of current introduced by current source $I_{bias2}$ needs to be withdrawn from node 54. The net current at the input node 54 has to be zero in the absence of a signal.

The basic idea of this preferred embodiment is to ensure that one of the current mirrors 70, 72 is operating on defined conditions while the other is passive. Both $T_2$ and $T_4$ are diode-connected devices, i.e. both transistors are always in saturation and a current I flows through each of them. In this configuration it is assumed that the operational amplifier can sink the current flowing through $T_2$. In absence of an input signal, no current flows through $T_1$ and $T_3$.

Assuming an incoming positive signal, the charge will be integrated on the feedback capacitor $C_F$. The voltage at the output drops, hence defining the right terminal of $T_1$ as source. As $V_{gs}$ of both $T_1$ and $T_2$ are equal, the first current mirror 70 is established, i.e. the same current I that flows through $T_1$ must flow also through $T_2$. (Of course, the person skilled in the art is well aware of the fact, that there is a certain transition period before $T_1$ reaches saturation.) The operation point of $T_3$ is forced by the current flowing through $T_1$, which can only be I. In this way the capacitor $C_F$ is discharged at a constant current I.

For negative signals the role of $T_1$ and $T_3$ is inverted. In such conditions $T_3$ establishes a current mirror with $T_4$, and the current flowing through $T_3$, which equals I, fixes the operation point of $T_1$. If $I_{bias1}=I_{bias2}=I$, a completely symmetrical response can be achieved.

Figure 8:
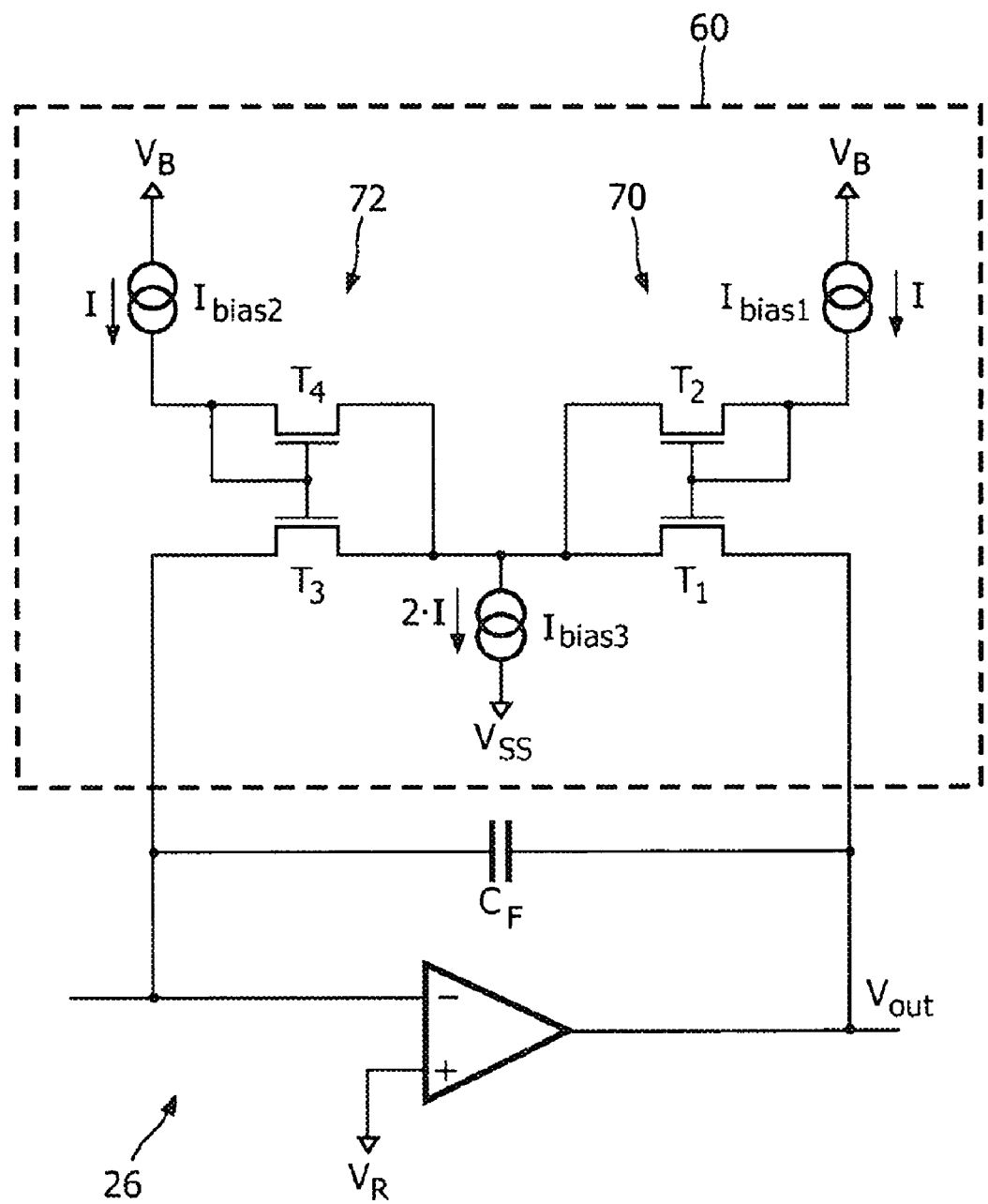
FIG. 8 shows a second preferred embodiment of the discharging circuit of the apparatus according to the present invention with a symmetrical design.

FIG. 8 shows a second preferred embodiment of the discharging circuit 60 of an apparatus 10 according to the present invention, wherein the discharging circuit 60 has a symmetrical design, which is again achieved by two current mirrors 70, 72. The functionality of this embodiment is very similar to the first preferred embodiment of the discharging circuit 60 according to FIG. 7, but it allows removing the current sink $I_{bias3}$ at the input node 54, which may be critical in terms of noise.

In this topology, assuming the case of negative input signals, the pair of transistors $T_1$ and $T_2$ forms the first current mirror 70. The surplus current I through $T_2$ can only flow through transistor $T_4$ as $I_{bias3}$ can only sink 21, i.e. the sum of the currents generated by $I_{bias1}$ and $I_{bias2}$. Therefore, also in this topology, the capacitor $C_F$ is discharged at constant current I. For positive signals the transistors take opposite roles.

Figure 9:
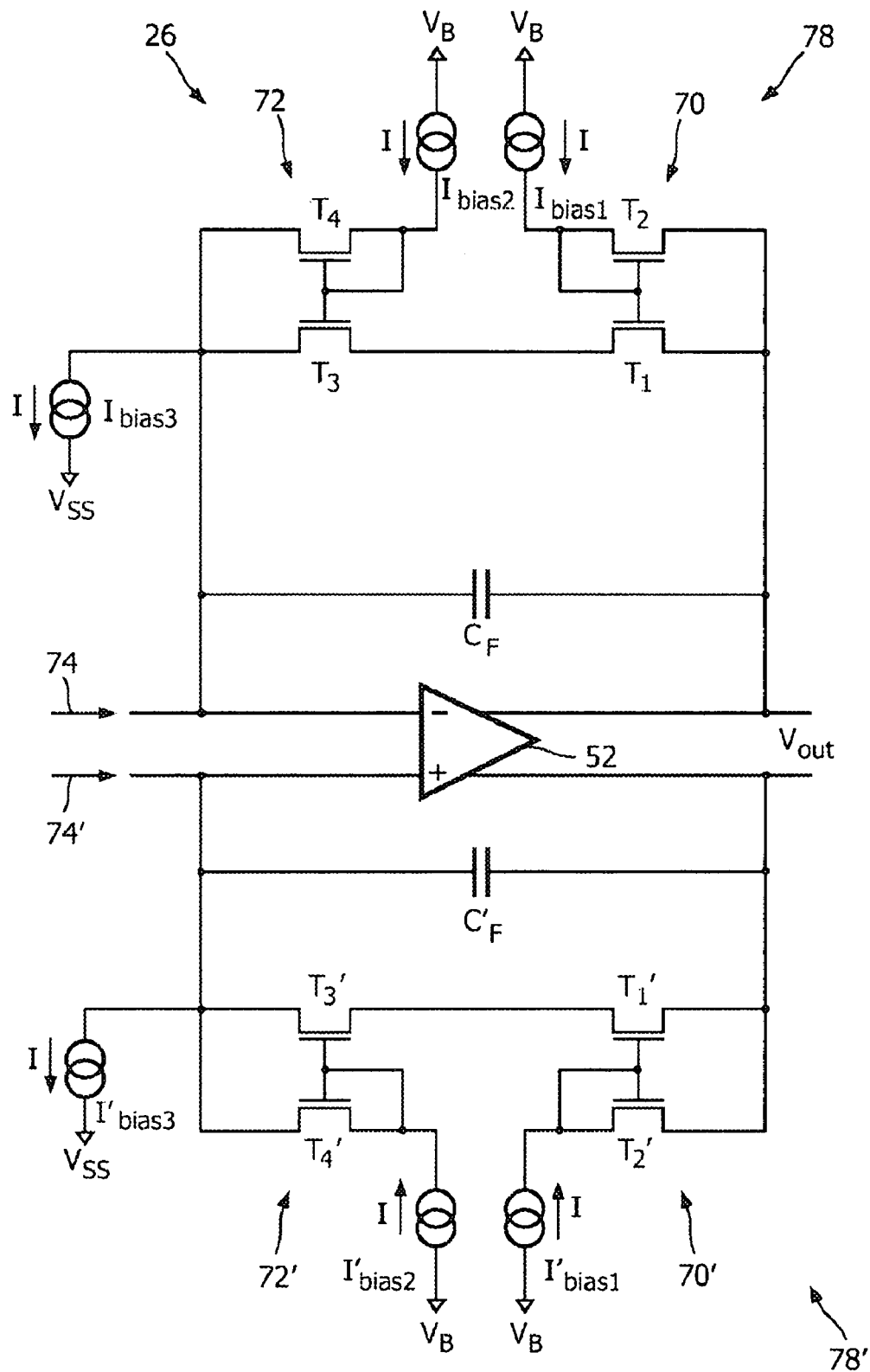
FIG. 9 shows a third preferred embodiment of the discharging circuit of the apparatus according to the present invention with a symmetrical differential design.

FIG. 9 shows a third preferred embodiment of the discharging circuit 60 of an apparatus 10 according to the present invention with a symmetrical differential design. The term "symmetrical differential" is meant in a sense that not one signal, but the difference of two signals 74, 74' is processed, wherein the circuitry for processing the first signal 74, the first section 78, is designed in the same manner as the circuitry for processing the second signal 74', the second section 78'.

In the context of the preferred embodiments, the signal going into the negative input of the differential amplifying element 52 will be called first signal 74, while the signal going into the positive input of the differential amplifying element 52 will be called second signal 74'. The first signal is represented by the arrow 74, and the second signal is represented by the arrow 74'.

Since, in this embodiment, the circuitries in the shaping element 26 for processing the first signal 74 and the second signal 74' each correspond to the circuitry explained in FIG. 7, reference is made to the explanations given there. The differential design ensures that common mode disturbances have little or no influence on the signal processing. The symmetrical differential design ensures that the first and second signals 74, 74' are essentially processed in an identical manner.

Figure 10:
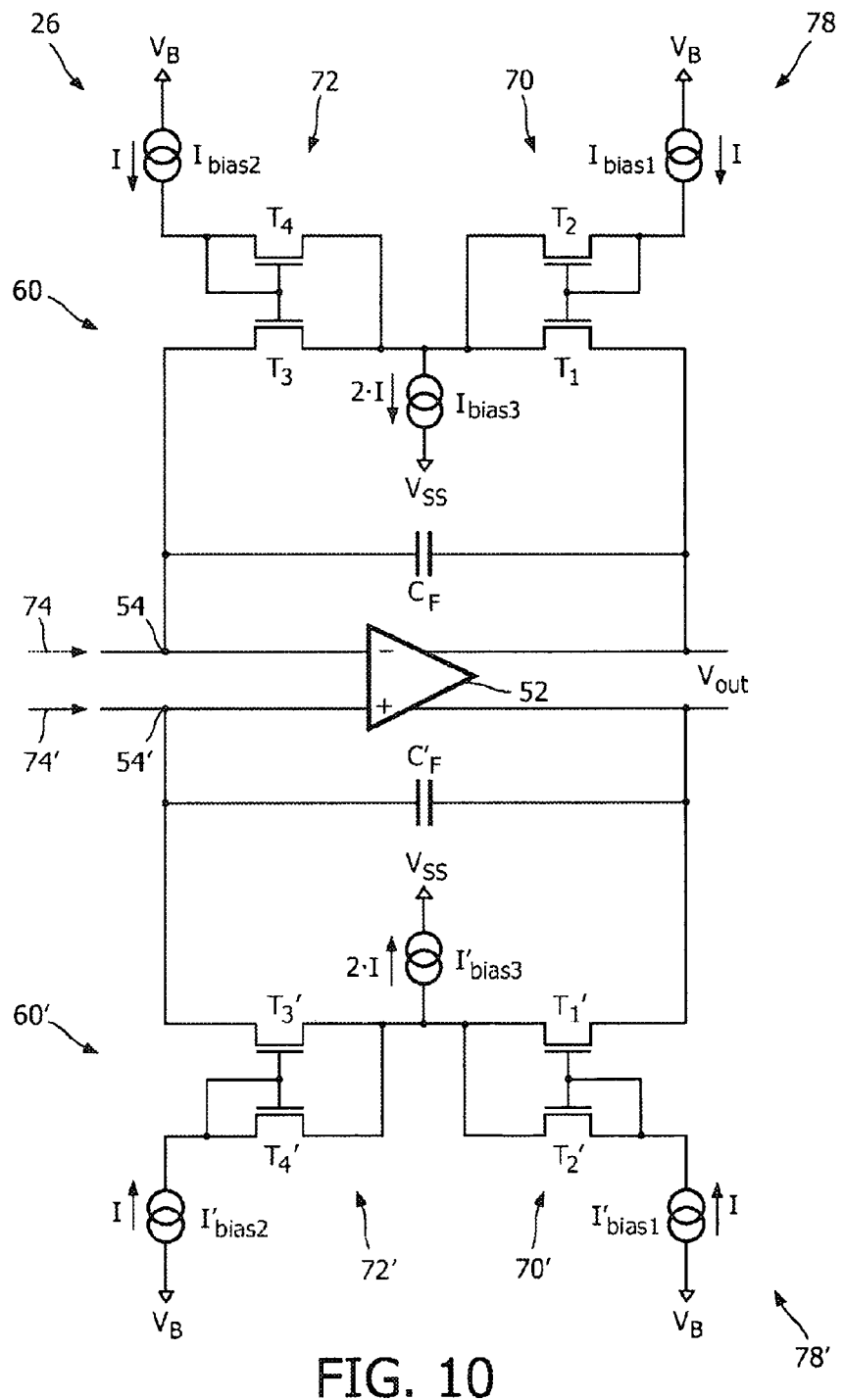
FIG. 10 shows a fourth preferred embodiment of the discharging circuit of the apparatus according to the present invention with a symmetrical differential design.

FIG. 10 shows a fourth preferred embodiment of the discharging circuit 60 of an apparatus 10 according to the present invention with a symmetrical differential design. Since, in this embodiment, the circuitries in the shaping element 26 for processing the first signal 74 and the second signal 74' each correspond to the circuitry explained in FIG. 8, reference is made to the explanations given there.

Figure 11:
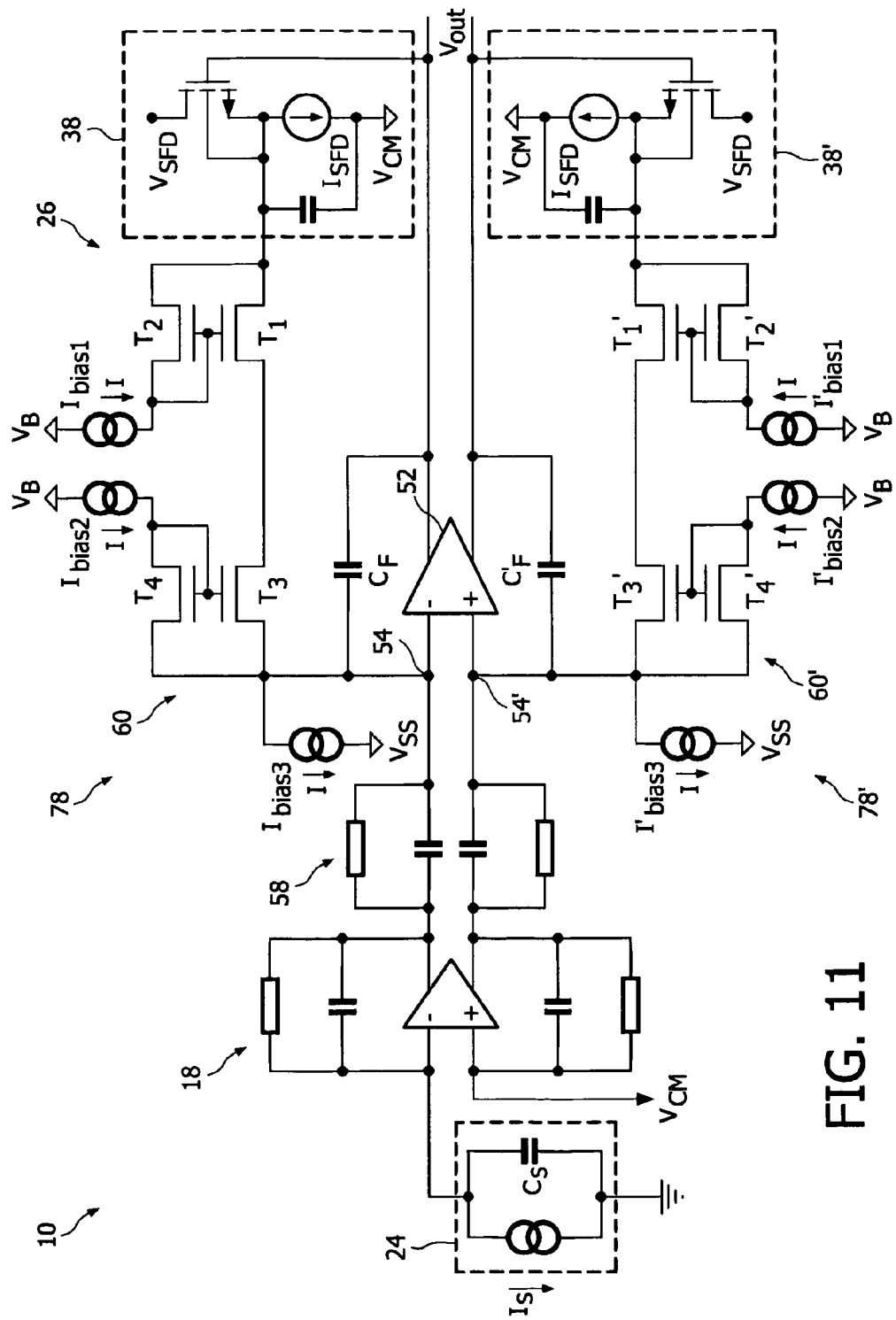
FIG. 11 shows a third preferred embodiment of the apparatus according to the present invention with a symmetrical differential design.

FIG. 11 shows a third preferred embodiment of an apparatus 10 according to the present invention. The main functional elements of this embodiment correspond to the embodiment shown in FIG. 3, wherein the pre-amplifying element 18, the pole-zero cancellation element 58 and the shaping element 26 are now designed for differential signal processing. The shaping element 26 is embodied as shown in FIG. 9 with additional delay circuits 38, 38'. Therefore, the functionality of this embodiment can be readily understood, when considering the explanations made in the context of FIGS. 3 and 9. It is again pointed out that while the pre-amplifying element 18 and the shaping element 26 are represented in two circuitries, they can be designed as one circuitry.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The terms "left", "right", etc. are used only for an eased understanding of the invention and do not limit the scope of the invention.

The mere fact that certain measures are recited in mutually different dependent claims does not indicate that a combination of these measures cannot be used to advantage. Any reference signs in the claims should not be construed as limiting the scope.

The invention claimed is:

1. Apparatus for generating countable pulses from impinging X-ray photons in a computer tomograph, the apparatus comprising a pre-amplifying element adapted to convert the charge pulse generated by an impinging photon into an electrical signal and a shaping element having a feedback loop and adapted to convert the electrical signal into an electrical pulse, wherein a delay circuit is connected electrically in parallel with the feedback loop to extend a time during which the feedback loop collects charges of the electrical signal in order to improve an amplitude of the electrical pulse at an output of the shaping element.

2. Apparatus according to claim 1, wherein the delay circuit is connected to an input of the shaping element and to the output of the shaping element.

3. Apparatus according to claim 1, wherein the delay circuit comprises a source-follower circuit adapted to react slowly to one of a positive or a negative signal.

4. Apparatus according to claim 1, wherein the delay circuit is connected to a switching element adapted to control a discharging of the feedback loop.

5. Apparatus according to claim 4, wherein a switching action of the switching element for discharging the feedback loop is delayed by the source-follower circuit.

6. Apparatus according to claim 4, wherein the switching element is integrated into a current mirror.

7. Apparatus according to claim 1, wherein a pole-zero cancellation element is electrically connected between the pre-amplifying element and the shaping element.

8. Apparatus according to claim 1, wherein the shaping element is provided with a compensating circuit adapted to compensate for temperature dependencies, introduced by the delay element.

9. Apparatus according to claim 8, wherein the compensating circuit is adapted to compensate by modifying a reference voltage of the pre-amplifying element and/or of the shaping element.

10. Apparatus according to claim 1, wherein the pre-amplifying element has a capacitor and a resistor arranged in parallel, wherein the resistor ($R_P$) has a value that ensures a discharge of the capacitor at high rates and a good noise performance.

11. Apparatus according to claim 1, wherein two topological current minors connected in series are connected in parallel to an amplifying element of the shaping element.

12. Apparatus according to claim 11, wherein a current sink is connected to the two topological current mirrors.

13. Apparatus according to claim 1, wherein the apparatus has a differential design, so that the difference between a first signal and a second signal is processed.

14. Apparatus according to claim 13, wherein a first section of the shaping element adapted to process the first signal has the same design as a second section of the shaping element adapted to process the second signal.

15. Imaging device based on the counting of X-ray photons comprising an apparatus according to claim 1.

16. Method for generating countable pulses from impinging X-ray photons in a computer tomograph, the method comprising the following steps:

pre-amplifying a charge pulse generated by an impinging photon into an electrical signal;

shaping the electrical signal into an electrical pulse by employing a feedback loop, wherein a delay circuit is connected electrically in parallel to the feedback loop to extend a time during which the feedback loop collects charges of the electrical signal in order to improve an amplitude of the electrical pulse;

reaching a condition that is adapted to act as a trigger for discharging the feedback loop; and discharging the feedback loop.

* * * * *